United States Patent [19]

Hergenrother et al.

[11] Patent Number: 4,623,525

[45] Date of Patent: Nov. 18, 1986

[54] STABILIZING COMPLEX FOR POLY(DICHLOROPHOSPHAZENE)

[75] Inventors: William L. Hergenrother, Akron; John W. Fieldhouse, Mogadore; Adel F. Halasa, Bath, all of Ohio

[73] Assignee: The Firestone Tire & Rubber Company, Akron, Ohio

[21] Appl. No.: 689,110

[22] Filed: Jan. 7, 1985

[51] Int. Cl.$^4$ .............................................. C01B 25/10
[52] U.S. Cl. .................................... 423/275; 423/265; 423/300
[58] Field of Search ....................... 423/265, 275, 300

[56] References Cited

PUBLICATIONS

Allcock et al., Inorganic Chemistry, vol. 5, pp. 1709–1715, 1966.
Sulkowski, "Synthesis of High Purity Hexachlorocyclotriphosphazene and Octachlorocyclotetraphosphazene," Chem. Stos. 26(2), 245–252, (1982).

Primary Examiner—John Doll
Assistant Examiner—Wayne A. Langel
Attorney, Agent, or Firm—Frank J. Troy, Sr.

[57] ABSTRACT

The present invention relates to the stabilization against water of solutions of poly(dichlorophosphazene) through the utilization of water reacting complexes of substituted silicon, tin, germanium or titanium chlorides which are complexed with a tertiary amine base.

6 Claims, No Drawings

STABILIZING COMPLEX FOR POLY(DICHLOROPHOSPHAZENE)

BACKGROUND OF THE INVENTION

1. Field of the Invention

This invention relates to the stabilization of solutions of poly(dichlorophosphazene) through the use of complexes with which water will preferentially react rather than the phosphorus-chloride bonds which are present in the poly(dichlorophosphazene) polymers.

2. Prior Art

Poly(dichlorophosphazene) is commonly dissolved in organic aprotic solvents such as benzene, toluene, chlorobenzene, tetrahydrofuran, 1,2-dimethoxy-ethane or cyclohexane. It is of great importance that the solvent which is used be free of water since water readily reacts with the reactive phosphorus-chloride bonds in the polymer backbone. The reaction of water with these bonds eventually leads to cross-linking and gelation of the poly(dichlorophosphazene) in solution. The cross-linked polymer is unsuitable for preparation of any stable derivatives of poly(dichlorophosphazene), thus the protection against cross-linking or gelation is necessary for any overall derivatization production scheme for substitution of poly(dichlorophosphazene).

H. R. Allcock et al., Journal of Inorganic Chemistry, Vol. 5, 1966, on page 1714, discloses that $SnCl_4$ can be added to poly(dichlorophosphazene) to inhibit the cross-linking process, however, this stabilization method has proven to be unsatisfactory for prolonged storage.

OBJECTS AND SUMMARY OF THE INVENTION

It is an object of this invention to provide a novel complex for inhibiting gelation or cross-linking of poly(dichlorophosphazene). It is an object of the present invention to produce a solution of poly(dichlorophosphazene) which is storable over a long period of time while it remains fluid and mobile and is capable of yielding satisfactory derivatives upon substitution.

These and other objects of this invention are obtained by use of a novel poly(dichlorophosphazene) stabilization complex. This stabilization complex is a mixture of compounds comprised of at least one compound selected from the group consisting of: $R_nSiCl_{4-n}$; $R_nGeCl_{4-n}$; $R_nSnCl_{4-n}$ and $R_nTiCl_{4-n}$ wherein: n is 0, 1, 2 or 3 and when $n \geq 1$, R represents one or more identical or different groups selected from $C_1$-$C_8$ alkyl or substituted or unsubstituted aryl groups; and at least one tertiary amine.

DETAILED DESCRIPTION OF THE INVENTION

The present invention relates to novel stabilizing complexes and their use in stabilizing solutions of poly(dichlorophosphazene) to prevent cross-linking or gelation of the polymer solution upon temporary or prolonged storage.

Poly(dichlorophosphazene) is commonly dissolved in organic solvents such as benzene, toluene, chlorobenzene, tetrahydrofuran, 1,2-dimethoxy-ethane or cyclohexane. It is highly important that the solvent which is employed for poly(dichlorophosphazene) be water free since water readily reacts with the reactive phosphorus-chloride bonds in the poly(dichlorophosphazene) backbone which eventually leads to cross linking and gelation of the poly(dichlorophosphazene) polymer. While the use of water is carefully avoided in combination with the production or storage of poly(dichlorophosphazene) in a solvent, in many instances water is inadvertently added to the solvent from the solvent equipment or upon exposure of the solution to the atmosphere. The instant stabilizing complexes demonstrate superior inhibiting properties in preventing cross linking or gelation of stored solutions of poly(dichlorophosphazene) and produce solutions of poly(dichlorophosphazene) which are storable over a long period of time while remaining fluid and mobile and are capable of yielding satisfactory derivatives upon substitution.

The stabilization complexes of the instant invention are a mixture of compounds comprised of: (1) at least one chloro substituted stabilizing compound selected from the group consisting of: $R_nSiCl_{4-n}$; $R_nGeCl_{4-n}$; $R_nSnCl_{4-n}$ and $R_nTiCl_{4-n}$ wherein: n is 0, 1, 2 or 3 and when $n \geq 1$, R represents one or more identical or different groups selected from alkyl from $C_1$-$C_8$, or substituted or unsubstituted aryl groups; and (2) at least one tertiary amine.

The chlorosubstituted stabilizing compounds of the present invention are represented by the formula:

$$R_nMCl_{4-n}$$

wherein M is Si, Ge, Sn or Ti; n is 0, 1, 2 or 3; and R represents one or more $C_1$-$C_8$ alkyl groups or substituted or unsubstituted aryl groups.

Typical chloro-substituted stabilizing compounds which can be employed in the present stabilizing complex include but are not limited to: $SiCl_4$; $C_6H_5SiCl_3$; $(C_6H_5)_2SiCl_2$; $(C_6H_5)_3SiCl$; $CH_3SiCl_3$; $(CH_3)_2SiCl_2$; $(CH_3)_3SiCl$; $(CH_3CH_2)SiCl_3$; $(CH_3CH_2)_2SiCl_2$; $(CH_3CH_2)_3SiCl$; $(C_3H_7)_nSiCl_{4-n}$; $(C_4H_9)_nSiCl_{4-n}$; $(C_5H_{11})_nSiCl_{4-n}$; $(C_6H_{13})_nSiCl_{4-n}$; $(C_7H_{15})_nSiCl_{4-n}$; $(C_8H_{17})_nSiCl_{4-n}$; $(CH_3)(CH_3CH_2)SiCl_2$; $CH_3C_6H_4SiCl_3$; $CH_3OC_6H_4SiCl_3$; $(CH_3)(C_6H_5)SiCl_2$ and the like wherein n has been defined heretofore.

Other suitable compounds include compounds as displayed above wherein the Si atom is substituted by a Ge, Sn or Ti atom, including but not limited to: $TiCl_4$; $C_6H_5TiCl_3$; $(C_6H_5)_2TiCl_2$; $(C_6H_5)_3TiCl$; $CH_3TiCl_3$; $(CH_3)_2TiCl_2$; $(CH_3)_3TiCl$; $(C_2H_5)_3TiCl$; $(CH_2H_5)_2TiCl_2$; $C_2H_5TiCl_3$; $(C_3H_7)_3TiCl$; $GeCl_4$; $(CH_3)_3GeCl$; $C_6H_5GeCl_3$; $(C_6H_5)_3GeCl$; $(CH_3)(C_2H_5)GeCl_2$; $SnCl_4$; $(CH_3)_3SnCl$; $(CH_3)_2SnCl_2$; $CH_3SnCl_3$ and the like. Mixtures of any of these compounds can also be employed within the scope of the present invention.

Typical tertiary amines which can be complexed with the chloro substituted stabilizing compounds of the present invention include but are not limited to tertiary amines represented by the general structure:

$$NR_1R_2R_3$$

wherein $R_1$, $R_2$ and $R_3$ can each independently be alkyl containing groups from 1 to 8 carbon atoms such as trialkyl amine such as trimethylamine, triethylamine, tri-isopropylamine, tri-n-propylamine, tri-isobutylamine, tri-n-butylamine, dimethylethylamine and the like. In addition, tertiary amines such as pyridine and those containing diamine groups such as N,N,N',N'-tetramethylethylene diamine (TMEDA) can also be utilized as well as mixtures of any of these tertiary amines.

The chloro substituted compounds and the tertiary amines preferably are utilized in equal molar proportions however an excess of either component does not substantially diminish the stabilizing characteristics of the stabilizing complex. While it is preferred that the chloro substituted compounds and tertiary amine compounds be utilized in approximately a 1:1 mole ratio for stabilizing purposes, the use of the compounds can be effective in a mole ratio ranging from 4:1 to 1:4 to be effective for stabilizing poly(dichlorophosphazene) solutions.

One mole of chloro-substituted stabilizing compound and one mole of tertiary amine form one mole of the stabilizing complex of the instant invention. It is necessary to employ at least one mole of the stabilizing complex for each mole of water impurifying the poly(dichlorophosphazene) solution. Thus one mole of stabilizer complex must be available to stabilize one mole of water impurity to be an effective stabilizing amount of stabilizing complex in the poly(dichlorophosphazene) solution. It is preferred that at least two moles of the stabilizer complex be present for each mole of water impurity to insure that the entire water impurity be sacrificially reacted with the chloro-substituted stabilizing compound.

While an effective stabilizing amount has been defined as at least one mole of stabilizing complex for each mole of water impurity, it is impossible to determine the quantity of water impurity which may be present in a poly(dichlorophosphazene) solution or negligently added to the solution. Ten drops of water is approximately 9.7 millimoles of water. Depending on the variables, such as the amount of poly(dichlorophosphazene) solution to be stabilized, storage techniques, etc., an effective stabilizing amount of stabilizing complex can range from 10 millimoles of each component to 100 millimoles of each component in the stabilizing complex.

Having now generally described the invention, the same will become better understood by reference to certain specific examples, which are included herein for the purposes of illustration only and are not intended to be limiting of the invention.

EXAMPLE I

A sample of 180 grams of a 14 weight % solution of poly(dichlorophosphazene) (25.2 grams) in cyclohexane was placed in a bottle. To this solution was added a mixture of 14.88 millimoles of triethylamine and 14.88 millimoles of trimethylchlorosilane and the mixture was shaken for two minutes. Ten drops (0.175 grams, 9.7 millimoles) of water was added to the solution which was then agitated for two minutes. The solution mixture was allowed to set and no gelation or thickening was noticed after 23 days of storage at 25° C.

COMPARATIVE EXAMPLES

Four poly(dichlorophosphazene) sample solutions identical to the sample poly(dichlorophosphazene) solution (180 grams) used in Example 1, were treated as follows:

The first comparative poly(dichlorophosphazene) solution (180 grams) was treated with ten drops (0.175 grams, 9.7 millimoles) of water and agitated for two minutes. The solution mixture was allowed to set and the polymer solution gelled in three days.

The second comparative poly(dichlorophosphazene) solution (180 grams) was mixed with 23.7 millimoles (2.57 grams) of trimethylchlorosilane and agitated for two minutes. Ten drops (0.175 grams, 9.7 millimoles) of water were then added to the mixture which was then agitated for an additional two minutes. The solution was allowed to set and the polymer solution gelled in three days.

The third comparative poly(dichlorophosphazene) solution (180 grams) was treated with 21.6 millimoles (2.18 grams) of triethylamine and agitated for two minutes. Ten drops of water were then added to the mixture which was further agitated for two minutes. The solution mixture was allowed to set and the polymer solution gelled in two minutes.

The fourth comparative poly(dichlorophosphazene) solution (180 grams) was treated with 23.7 millimoles (2.57 grams) of trimethylchlorosilane and agitated for two minutes. Ten drops of water was then added to the mixture which was again agitated for two minutes. Finally, 21.6 millimoles (2.18 grams) of triethylamine was added to the mixture which was further agitated for two minutes. The solution mixture was allowed to set and the polymer solution gelled in 10 minutes.

EXAMPLES 2 TO 15

In Examples 2 to 15, the following procedures were utilized. For each Example, a bottle was charged with 180 grams of a 14.0 weight % solution of poly(dichlorophosphazene), 15 millimoles of a chloro substituted compound and 15 millimoles of a tertiary amine. The components were agitated and then 9.7 millimoles (0.175 grams) of water was added to the bottle. The contents of the bottle were further agitated and allowed to set. The example mixtures were then viewed to determine if gelation of the poly(dichlorophosphazene) occured. The specific stabilizers utilized and the results of their effectiveness in preventing gelation are displayed in Table 1 below:

TABLE 1

| Example No. | Chloro Substituted Stabilizer | Tertiary Amine | Time to Gelation |
|---|---|---|---|
| 2 | $SiCl_4$ | $(C_2H_5)_3N$ | * |
| 3 | $C_6H_5SiCl_3$ | $(C_2H_5)_3N$ | * |
| 4 | $(C_6H_5)_2SiCl_2$ | $(C_2H_5)_3N$ | * |
| 5 | $(CH_3)_2SiCl_2$ | $(C_2H_5)_3N$ | * |
| 6 | $(C_6H_5)_3SiCl$ | $(C_2H_5)_3N$ | * |
| 7 | $(C_2H_5)_3SiCl$ | $(C_2H_5)_3N$ | * |
| 8 | $(CH_3)_3SiCl$ | $(C_2H_5)_3N$ | * |
| 9 | $GeCl_4$ | $(C_2H_5)_3N$ | * |
| 10 | $SnCl_4$ | $(C_2H_5)_3N$ | * |
| 11 | $(n-C_4H_9)_3SnCl$ | $(C_2H_5)_3N$ | 30 Minutes |
| 12 | $(C_6H_5)_3SnCl$ | $(C_2H_5)_3N$ | 30 Minutes |
| 13 | $TiCl_4$ | $(C_2H_5)_3N$ | * |
| 14 | $(CH_3)_3SiCl$ | Pyridine | * |
| 15 | $(CH_3)_3SiCl$ | TMEDA | * |

*No gellation noted after 23 days of storage at which time the experiment was terminated.

We claim:

1. A poly(dichlorophosphazene) polymer solution comprising a stabilization effective amount of at least one tertiary amine and at least one chloro-substituted compound selected from the group consisting of: $R_nSiCl_{4-n}$; $Rphd nGeCl_{4-n}$; $R_nSnCl_{4-n}$ and $R_nTiCl_{4-n}$ wherein n is 0, 1, 2 or 3 and when $n \leq 1$, R represents one or more identical or different groups selected from $C_1-C_8$ alkyl or substituted or unsubstituted aryl groups.

2. A poly(dichlorophosphazene) polymer solution as defined in claim 1 wherein the chloro-substituted compound is selected from the group consisting of SiCl$_4$; GeCl$_4$; SnCl$_4$ and TiCl$_4$.

3. A poly(dichlorophosphazene) polymer solution as defined in claim 1 wherein the tertiary amine is selected from the group consisting of trimethylamine, triethylamine, tripropylamine, dimethylethylamine, pyridine, and N,N,N',N'-tetramethylethylene diamine.

4. A poly(dichlorophosphazene) polymer solution as defined in claim 1 comprising at least one mole of the chloro-substituted compound and at least one mole of the tertiary amine for each mole of water impurity in the poly(dichlorophosphazene) polymer solution.

5. A poly(dichlorophoshazene) polymer solution as defined in claim 1 wherein the chloro-substituted compounds and the tertiary amines are present in a mole ratio ranging from 4:1 to 1:4.

6. A poly(dichlorophoshazene) polymer solution as defined in claim 1 wherein the chloro-substituted compounds and the tertiary amines are present in a mole ratio of 1:1.

* * * * *

UNITED STATES PATENT AND TRADEMARK OFFICE
CERTIFICATE OF CORRECTION

PATENT NO. : 4,623,525
DATED : November 18, 1986
INVENTOR(S) : W. L. Hergenrother, J. W. Fieldhouse, A. F. Halasa It is certified that error appears in the above-identified patent and that said Letters Patent are hereby corrected as shown below:

Column 2, line 47, $(CH_2H_5)_2TiCl_2$ should read $(C_2H_5)_2TiCl_2$

Column 4, line 62, $Rphd\ nGeCl_{4-n}$ should read $R_nGeCl_{4-n}$

Signed and Sealed this

Twenty-eighth Day of April, 1987

Attest:

DONALD J. QUIGG

Attesting Officer

Commissioner of Patents and Trademarks